United States Patent [19]
Johnson et al.

[11] 4,047,190
[45] * Sept. 6, 1977

[54] HYBRID EXPOSURE CONTROL SYSTEM EMPLOYING DUAL MAXIMUM BLADE DISPLACEMENT

[75] Inventors: Bruce K. Johnson, Andover; George D. Whiteside, Lexington, both of Mass.

[73] Assignee: Polaroid Corporation, Cambridge, Mass.

[*] Notice: The portion of the term of this patent subsequent to July 22, 1992, has been disclaimed.

[21] Appl. No.: 621,397

[22] Filed: Oct. 10, 1975

[51] Int. Cl.² .................................................. G03B 7/14
[52] U.S. Cl. ........................................ 354/27; 354/32; 354/59
[58] Field of Search .................... 354/27, 32, 42, 49, 354/59

[56] References Cited
U.S. PATENT DOCUMENTS 3,896,458  7/1975  Johnson et al. ..................... 354/59

Primary Examiner—L. T. Hix
Assistant Examiner—J. A. LaBarre
Attorney, Agent, or Firm—David R. Thornton

[57] ABSTRACT

An exposure control system for photographic apparatus having a shutter-diaphragm mechanism for regulating the exposure aperture and the exposure interval under both ambient and flash illumination conditions. The shutter-diaphragm includes a blade arrangement which when driven in an opening direction provides enlarging aperture values in a tracking relation defining both a taking aperture and a photocell aperture until both achieve a maximum at which time further blade displacement provides a reduction in the photocell aperture to accommodate ambient, low scene light conditions. Under flash conditions, the system employs hybrid operation in which the exposure aperture is selected by a follow-focus mechanism in accordance with subject distance while the interval is determined by the scene light transmitted to the photocell. For large subject distances, the range of the follow-focus mechanism is restricted so as to limit the blade displacement to that at which both aperture values substantially achieve their maximum values.

7 Claims, 11 Drawing Figures

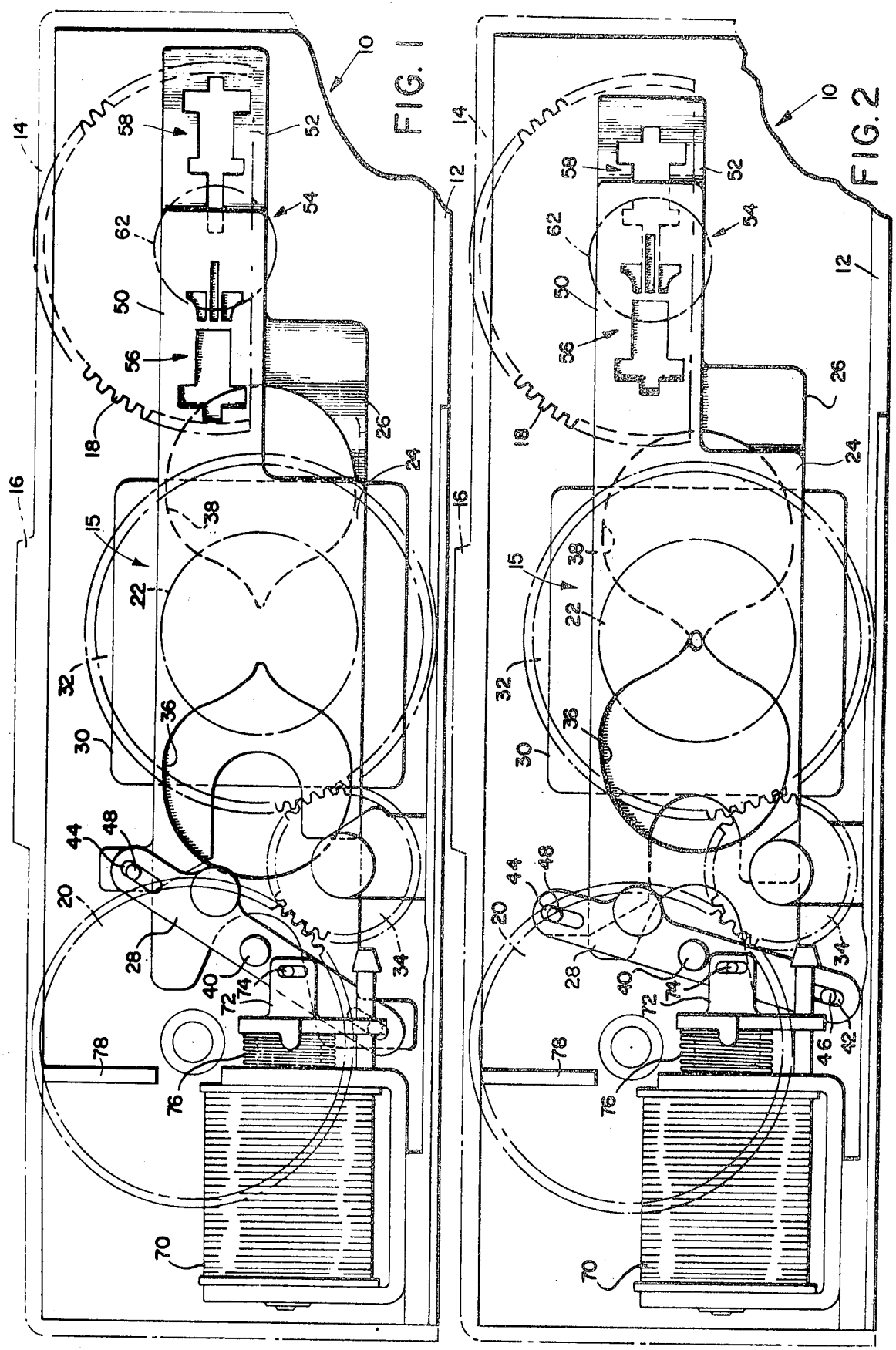

HYBRID EXPOSURE CONTROL SYSTEM EMPLOYING DUAL MAXIMUM BLADE DISPLACEMENT

BACKGROUND OF THE INVENTION

The invention relates generally to photographic exposure control system and, more particularly, to an exposure control system which is responsive to scene lighting in both ambient and flash modes of operation.

In U.S. Pat. No. 3,896,458, an automatic exposure control system responsive to scene light in ambient operation and additionally responsive to a subject distance in flash operation is described. In that arrangement, a shutter-diaphragm mechanism simultaneously defines two correlated aperture values respectively controlling the scene light emitted to both the film plane and the camera photocell.

In operation, the shutter-diaphragm is driven from a closed position through enlarging aperture values with the photocell aperture in a leading arrangement to the taking aperture so as to provide suitable anticipation of the final exposure value when the optical path is again blocked in accordance with a termination signal from the photocell network. For ambient operations, the correlation between the two aperture values is altered to provide relatively lower input to the photocell in compensation for the reduction in anticipation factor inherent with a long exposure interval. However, in flash operation, the shutter-diaphragm is halted at predetermined positions so as to select an operational aperture value in accordance with subject distance, preferably with camera focusing. For optimum film exposure, it is important to provide compatible operation of the photo-responsiveness in both modes of operation.

Consequently, it is an important object of this invention to provide an improved photographic exposure control system.

It is another primary object of this invention to provide an improved automatic exposure control system suitable for both flash and ambient illumination.

Still another object of this invention is to provide a shutter-diaphragm exposure control system responsive solely to scene brightness when operated in an ambient mode and responsive to both scene brightness and subject distance when operated in a flash mode.

SUMMARY OF THE INVENTION

In accordance with the general concept of the invention, the exposure control system initially defines enlarging values of both a taking aperture and a photocell aperture and then reduces the latter once the former has achieved its maximum value. In a flash mode, the system selects an aperture value in accordance with a subject distance setting and precludes operation of the system in the range of reduced photocell aperture.

In the illustrated system, a blade member forming part of a shutter-diaphragm mechanism is displaced along a given path to vary the scene light emitted to a light-responsive element as well as to the film plane in a preprogrammed arrangement in which a secondary or photocell aperture is opened in a leading arrangement to a taking aperture, passes through a maximum in substantial synchronization with the achievement of a maximum taking aperture and then falls to a slightly reduced value. Stop means are included for limiting the maximum displacement of the blades to their final position wherein the photocell aperture is in its reduced condition. For flash mode control, a follow-focus stop is positioned at predetermined locations in the blade path so as to select a predetermined aperture value in accordance with subject distance, and means are provided for limiting the positioning of the follow-focus stop within a range which precludes displacement of the blade member through the blade position where the maximum photocell aperture is achieved so that the reduced photocell response is automatically eliminated from flash mode operation.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof will best be understood from the following description of the preferred embodiment when read in connection with the accompanying drawings wherein like numbers have been employed in the different figures to denote the same parts and wherein:

FIG. 1 is a diagrammatic front elevational view of an exposure control system incorporating features of the instant invention, the view having portions broken away or removed to reveal internal structure;

FIG. 2 is a front elevational view of the exposure control system of FIG. 1 showing the components thereof in an orientation defining aperture openings;

DETAILED DESCRIPTION OF THE INVENTION

Figure 4A:
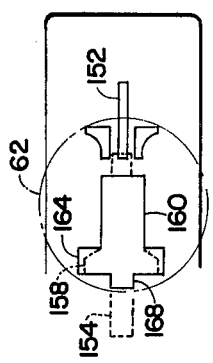
FIG. 4a is a fragmentary view of the photocell aperture when the blades are in the maximum flash mode orientation shown in FIG. 4.

Referring now to FIG. 1, it can be seen that the exposure control system includes a housing 10 which comprises a rear casting 12 selectively machined to support the components of the system. Surrounding the front and top of the casting 12 is a cover 14 which is structured as shown at 16 to support a packaged flashlamp array and related components and which includes openings (not shown) through which protrude manually adjustable trim and focus wheels partially shown in dotted outline at 18 and 20, respectively. Centrally disposed within the back wall of the casting 12 is an exposure or light-entering opening 22 which defines the maximum available exposure aperture for the system.

Mounted on casting 12 is a shutter-diaphragm mechanism 15 formed of a pair of elongated blades 24 and 26 which cooperate with an interconnecting actuator or walking beam 28. The blades 24 and 26 are slideably mounted on casting 12 by means of a bracket 30 which also serves to support an externally threaded lens housing illustrated at 32. Connection between the lens assembly 32 and the focus wheel 20 is provided by an idler gear shown at 34 such that rotation of the focus wheel 20 provides displacement of the lens assembly 32 for focusing of image-carrying rays passing through the main aperture (when the blades 24 and 26 are in an open orientation as in FIG. 2) to a rearwardly positioned film plane (not shown) when the system of FIG. 1 is employed in conjunction with a suitable film exposure chamber.

A pair of openings 36 and 38 formed in the blades 24 and 26 provide variable aperture openings in accordance with longitudinal displacement of one blade with respect to the other responsive to movement of the walking beam 28. In this respect, it can be seen that the walking beam 28 is journaled for rotation around a stud 40 extending from the rear casting 12. Elongate slots 42 and 44 formed in the distal ends of the walking beam 28 provide coupling with pins 46 and 48 fixed to and extending respectively from blades 24 and 26. Thus interconnected, the blades 24 and 26 move simultaneously with each other to define a main aperture opening of progressively varying value over the light entrance opening 22.

The blades 24 and 26 include end portions shown respectively at 50 and 52 which extend through a light detecting station 54. These end portions 50 and 52 overlie a photocell 62 of a light integrating unit 64 (shown in FIG. 9) such that the openings 56 and 58 define a secondary or photocell aperture of progressively varying value in accordance with movement of the blades 24 and 26. Hence, the openings 56 and 58 in combination with blade displacement provide means for varying the input of the light integrating unit 62 and it can be seen that the instantaneous aperture values defined by the secondary openings 56 and 58 are derived in synchronism or tracking relation with particular aperture values provided by the openings 36 and 38.

A tractive electromagnetic device in the form of a solenoid 70 is employed to displace the blades 24 and 26 with respect to each other and the casting 12. As illustrated in FIG. 1 of the drawings, the solenoid armature 72 is affixed to the walking beam 28 by means of a pin or stud 74 such that displacement of the armature 72 will rotate the walking beam 28 around its pivot pin 40 and appropriate displace the shutter blades 26 and 24. A spring member 76 surrounds the solenoid armature 72 and biases it so as to tend to open the blades. This arrangement is designed for use in a reflex camera in which a normally open condition facilitates viewing and focusing procedures. Consequently, in the present arrangement, the blades 24 and 26 are drawn to their closed position as shown in FIG. 1 only while the solenoid 70 is energized. De-energization of the solenoid 70 permits the blades 24 and 26 to move toward their maximum aperture opening under the urging of the spring 76. This driving arrangement for the exposure control mechanism is described in more detail in the U.S. Pat. No. 3,868,712 issued to Conrad H. Biber on Feb. 25, 1975. It should be understood, however, that the automatic exposure control system of the invention is equally applicable to photographic systems where the blades are held in a normally closed position.

Figure 4:
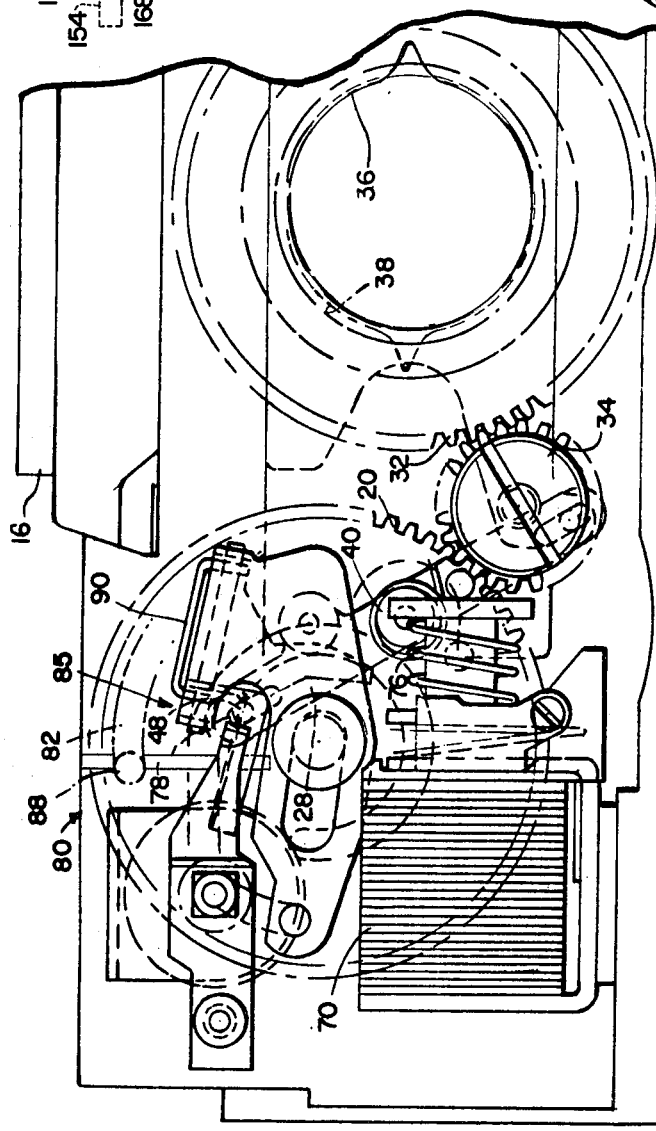
FIG. 4 is a fragmentary view of the exposure control system of FIG. 1 showing the follow-focus mechanism of the invention and depicting the maximum blade displacement under flash mode control.
Figure 7:
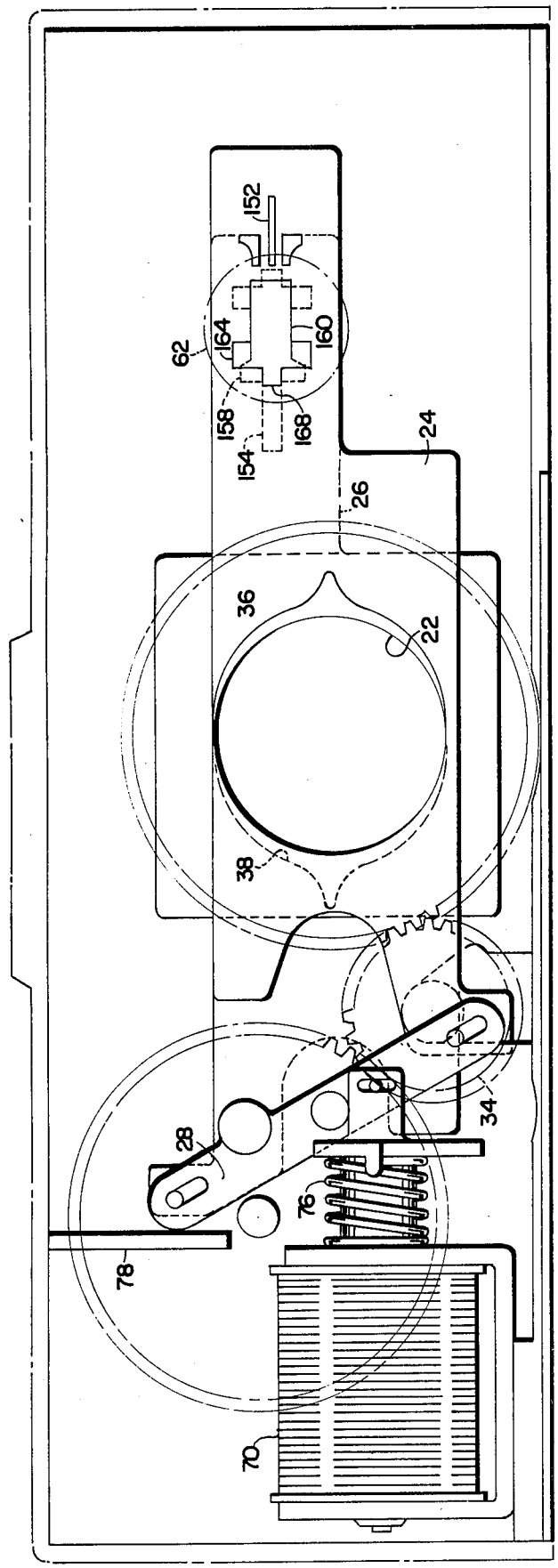
FIG. 7 is a plan view of the mechanism of FIG. 1 showing the components thereof in an orientation defining the maximum blade displacement under ambient mode control.

In operation of the system, blades 24 and 26 are displaced from their terminal blocking position shown in FIG. 1 to provide enlarging aperture values, for example, as shown in FIG. 2, by de-energizing the solenoid 70 which permits the spring 76 to drive plunger 72 outwardly of the solenoid and, in turn, rotate walking beam 28 in a counterclockwise direction (as viewed in FIG. 1) to force the aperture forming openings 36 and 38 and 56 and 58 into increasing coincidence as shown in FIGS. 2, 4 and 7. The exposure interval is then terminated by again energizing the solenoid 70 so as to retract the plunger 72 against the spring 76. In low light level ambient, the blades 24 and 26 reach a terminal open position shown in FIG. 7 wherein the beam 28 engages a wall-like member or rib 78 of the casting 12 which functions as a stop for the opening displacement of the blades.

Figure 3:
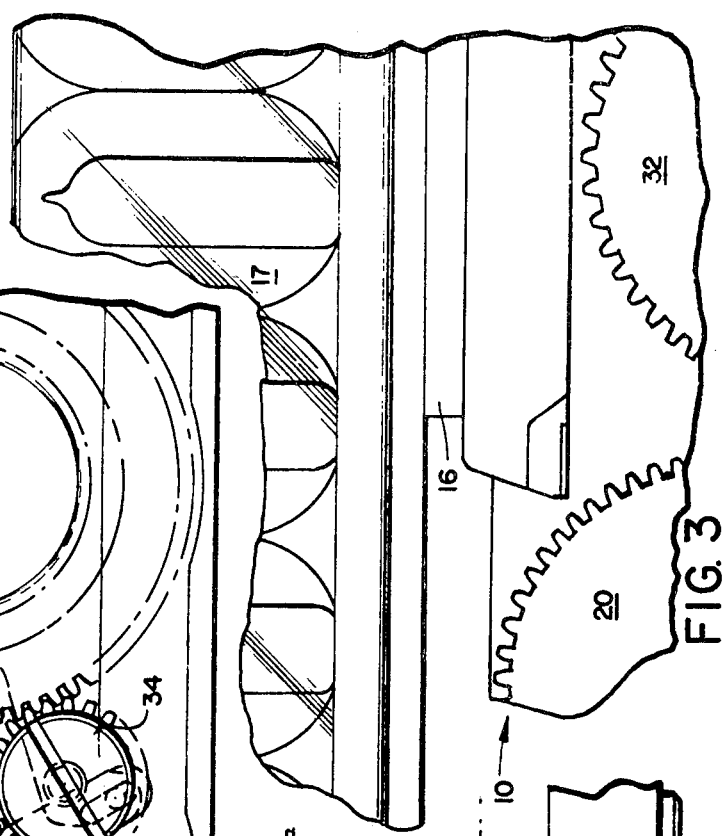
FIG. 3 is a fragmentary view of the system of FIG. 1 in combination with a flash array.
Figure 5:
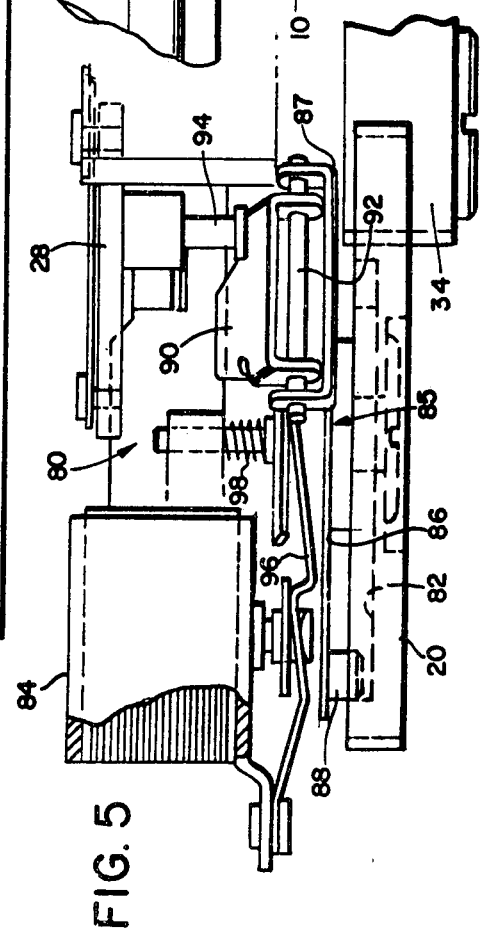
FIG. 5 is a fragmentary view of the follow-focus mechanism illustrated in FIG. 4 with portions broken away to reveal internal features.
Figure 6:
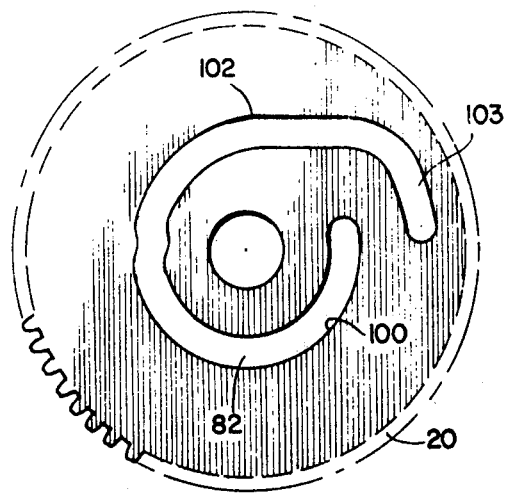
FIG. 6 is a plan view of the cam mechanism employed in the follow-focus mechanism illustrated in FIGS. 4 and 5.

As later explained in more detail with regard to the overall operation of the exposure control system, a followfocus mechanism 80, shown in detail in FIGS. 4 and 5, is employed in conjunction with the light integrating unit 64 in the flash mode operation of the camera. As shown in FIGS. 4 and 5, the focus wheel 20 carries on its underside a cam track 82 (also shown in FIG. 6) within which a cam follower 85 is located. The cam follower 85 extends from beneath the focus wheel 20 to a point where it may be utilized to engage and stop the travel of the walking beam 28 at selected points in the beam path. This follow-focus mechanism 80 is made effective only when a flash unit 17 is mounted on the mechanism 14 as shown in FIG. 3. Hence, the follow-focus mechanism is energized or, that is, rendered operative by means of a solenoid designated at 84 which, in effect, provides mechanical coupling between the focusing wheel 20 and the walking beam 28 so as to effect the aperture adjusting feature of the exposure mechanism in accordance with focusing of the lens assembly 32 or, that is, in accordance with the rotational position of the focus wheel 20. As previously indicated, the taking lens 32 and the focus wheel 20 are intercoupled by means of the interposed idler gear 34.

Referring now to FIG. 5 wherein the follow-focus mechanism 80 is shown in elevation with the focusing wheel placed at the bottom of the view, it can be seen that the cam follower comprises an arm member 86 which extends across the focus wheel 20 and carries at one end a stud 88 which is positioned within the cam track 82. Carried at the other end 87 of the arm 86 opposite from the stud 88 is an interceptor element 90 which is pivotally mounted to the arm 86 by a shaft 92 and is operable in accordance with energization of the follow-focus solenoid 84 to intercept a depending stud 94 of the walking beam 28. This interception is accomplished by means of an arm member 96 which couples the solenoid 84 to the interceptor member 90. A spring member 98 is employed to urge the solenoid arm 96 downwardly so as to hold the interceptor 90 in a normally inoperative position.

As later explained with regard to FIG. 9, upon insertion of a flash array 17 (shown in FIG. 3), the exposure control system is automatically programmed for flash mode operation which includes automatic energization of solenoid 84 and, hence, operation of the follow-focus mechanism 80, responsive to initiation of an exposure interval. That is, following closing of the blades 24 and 26, just prior to exposure, the solenoid 84 is energized to draw the extended arm 96 in a direction away from the focus wheel 20 to pivot the interceptor 90 into the path of the walking beam stud 94 which arrests the movement of the walking beam at a given point and thereby selects the final aperture values to be employed during that exposure. The precise location of the blades at which this interception will occur is related to the rotational focus position of the wheel 20.

As indicated, the follow-focus mechanism 80 is designed to vary the position of the interceptor 90 responsive to the rotation of the focus wheel 20. This is accomplished by means of the cam track 80 which as shown in FIG. 5 has essentially three different camming surfaces or angles. A first of such camming surface indicated at 100 represents the shortest focal distances for which the exposure mechanism may be arranged. The camming surface 102 represents intermediate focal distance, and the camming surface 103 is employed as far distances. Rotation of the focus wheel in a counterclockwise direction, as viewed in FIG. 5, which moves the lens 34 to a large subject distance setting, displaces the interceptor 90 a proportionate distance from its initial location (not shown) to the left towards its final location as shown in FIG. 4. For example, as the focus wheel 20 is rotated to provide a lens position for subject-to-lens distances of 10 feet to infinity, the cam stud 88 enters the third cam angle 103, and the latter cam angle determines the maximum blade displacement (shown in FIG. 4) under flash conditions at which, as later explained with regard to FIG. 8, both the taking aperture and the photocell apertures are at substantially their maximum values.

Prior to completing the description of the hybrid control, the ambient mode operation will be explained. In the operation of the exposure control system, the follow-focus mechanism is disabled during ambient mode operation. That is, as later explained with regard to FIG. 9, when a flash array is not mounted on the exposure control system, the follow-focus is inoperative and the exposure control system functions solely under the control of the light-detecting station 54. In this arrangement once the viewing mode has been completed and the exposure chamber (not shown) prepared for exposure, the control solenoid 70 has driven the blades 24 and 26 to their closed position shown in FIG. 1, and the exposure interval is then initiated by de-energizing the solenoid 70 to thereby release the blades which subsequently determine progressively enlarging apertures over both the exposure opening 22 and the photocell 62. During this exposure interval, the photocell 62 receives increasing amounts of scene light due to its progressively enlarging aperture value until it receives a total amount of light equal to a previously programmed value which initiates termination of the exposure interval. This termination is brought about by a signal which again energizes solenoid 70 to reclose the blades 24 and 26.

Figure 8:
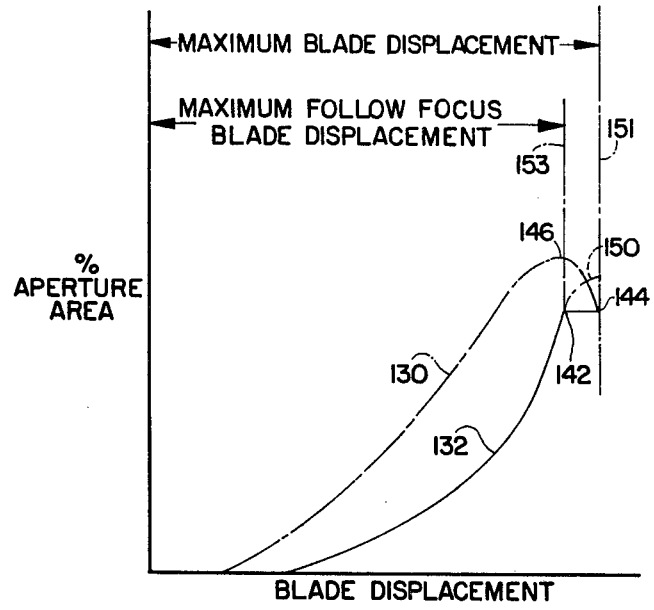
FIG. 8 is a graph depicting the aperture values of both the main aperture and the photocell aperture responsive to displacement of the shutter mechanism shown in FIG. 1.

In the ambient mode, since the interceptor 90 is not positioned for interception, both the size of the main aperture and the photocell aperture are progressively enlarged until a close command is received. These enlarging aperture values are depicted in FIG. 8. The secondary or photocell aperture values defined by openings 56 and 58 produce a curve as approximately depicted at 130 when the blades 24 and 26 are driven from a fully closed position shown in FIG. 1 to a full open position shown in FIG. 7. Likewise, the primary or main exposure aperture also follows a curve approximately as depicted at 132 during this blade movement.

It should be understood that generally the photocell aperture area or value is much smaller than the area of the corresponding taking aperture. However, in FIG. 8, the curves are normalized; a normalized photocell area being defined as one which provides a correct exposure interval for a scene brightness where a long exposure time is employed such that opening and closing times become negligible. The final photocell aperture value depicted in this figure at 144 represents this normalized area.

As can be seen, the photocell aperture leads the main aperture or, that is, opens at a faster rate relative to its full open position than does the main aperture. This leading initially occurs because the openings 56 and 58 of the blades are closer together and begin to overlap sooner than the main openings 36 and 38 when the blades are displaced relative to each other in an opening direction. This lead time is employed so that the light-integrating unit 64 can provide an adequate anticipation of, or brightness sample related to, the total amount of light passing through the main aperture by the time the blades are closed, and thus take into account solenoid reaction time and the blade closing time.

Under low ambient light conditions, the system achieves a maximum taking aperture, designated at 142 in FIG. 8, which is determined by opening 22. Preferably, the photocell opening is also configured to simultaneously reach a maximum designated at 146 to provide an appropriate exposure time interval for the flash mode. That is, at one point (designated at 153 in this figure) in the blade displacement both apertures achieve a maximum, and flash operation limits blade deflection to this point. For ambient, however, it is preferred that the photocell aperture then decrease to the normalized area shown at 144. In the illustrated embodiment, the main openings 36 and 38 slightly exceed the area of opening 22 and are elongated so as to permit slightly further displacement of the blades 24 and 26 in an opening direction without reducing the maximum aperture determined by the opening 22. At low light levels, when this maximum value 142 of the taking aperture is achieved, the blades 24 and 26 continue to be displaced in an opening direction which provides a reduced photocell aperture value corresponding to that shown at 144; this level being less than the maximum photocell aperture designated at 146. Hence, under ambient conditions, the maximum blade displacement occurs at 151 when the beam 28 engages the fixed stop 78 shown in FIG. 7, while both the taking aperture and the photocell aperture have previously achieved a maximum as designated at point 153. On the other hand, as later explained in detail, the follow-focus mechanism precludes blade displacement beyond the maximum point 153 when the system is under flash mode control.

Consequently, it should be understood that while the aperture formed by the main openings 36 and 38 actually continues to enlarge slightly (as depicted at 150 in FIG. 8) beyond the maximum taking aperture achieved at point 142, the added enlargement 150 does not provide any increase in aperture value because the exposure opening 22 limits the final taking aperture to that shown at 142.

Figure 10:
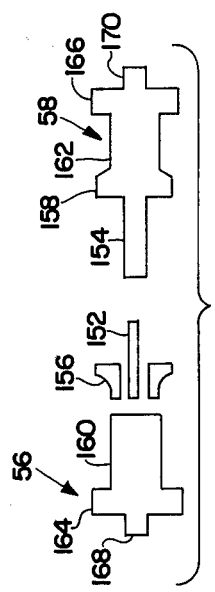
FIG. 10 is a plan view of the blade openings employed to provide the photocell aperture in the exposure control system illustrated in FIG. 1.

Before turning to the flash mode operation, the reduction in photocell aperture value will be described. This reduction is primarily achieved by the shape of the secondary openings 56 and 58 which as shown in FIG. 10 are elongated openings respectively including leading portions designated at 152 and 154. Following each of these leading portions 152 and 154 are relatively wide openings, designated at 156 and 158, respectively, which provide abrupt steps from the narrow leading portions. Proceeding further from the indicated leading ends thereof, intermediate portions 160 and 162, respectively, are next encountered. Proceeding still further away from the leading end portions 152 and 154, the widest portions, designated at 164 and 166 respectively, are encountered. Finally, relatively narrow end portions designated at 168 and 170 form the trailing ends of the aperture defining openings 56 and 58.

As previously noted, when the blades 24 and 26 are displaced from their light-blocking position (see FIG. 1), the leading end portions 152 and 154 initially overlap to provide a relatively small photocell aperture shown in FIG. 2. As movement of the blades continues to a full open position, the widest portion 164 and 158 comes into overlying relation with each other as shown in FIG. 4 which provides a maximum photocell aperture value. Finally, when the blades are displaced to their final position against the stop 78, the widest portions 164 and 158 pass over each other and slightly out of registration as shown in FIG. 7 to provide a slight decrease in the photocell aperture value.

Turning now to the flash mode, it should be first noted that the exposure control system operates under flash conditions, as a hybrid system which regulates the exposure with regard to both subject distance and scene lighting. That is, as noted in the parent case, an aperture value is selected by the follow-focus mechanism while the exposure interval is determined by the light integrating arrangement.

As in the ambient mode, the camera exposure chamber is first prepared for an exposure cycle by energizing the solenoid 70 to draw the blades 24 and 26 to their closed position and by displacing the mirror member (not shown) from its viewing position to its exposure position. At this point in the overall sequence, the exposure control system is automatically triggered to operate through an exposure phase as later explained with respect to FIG. 9. For the flash mode, timing signals are generated to energize the follow-focus mechanism 80, open the blades 24 and 26 and to energize the light-integrating network 64. After a suitable delay to permit the blades 24 and 26 to reach their selected aperture as determined by the follow-focus interceptor, a flash bulb is fired. At this time, the light-integrating unit 64 is operative such that upon receiving a sufficient total amount of light, it energizes solenoid 70 to again close the blades 24 and 26.

Since the blade mechanism is employed for both ambient and flash operation, and the response of the photocell is varied for low light level conditions, different limits to blade displacement for each mode of operation are provided. For ambient, the latter is accomplished by the fixed stop 78 which determines the maximum blade displacement and the final aperture values depicted in FIG. 8, whereas in flash operation the cam track 82 in conjunction with the follow-focus mechanism 80 limits the displacement of the interceptor 90 at far distance focusing to a location which stops the blades 24 and 26 just short of the fixed stop location and at a point where both the taking aperture and the photocell aperture are at their maximum value. Hence, the stop 78 provides means for limiting the blade displacement to a first maximum for the ambient mode and the cam 20 in conjunction with the follow-focus mechanism 80 provides means for limiting the blade displacement to a second maximum for flash operations.

Figure 9:
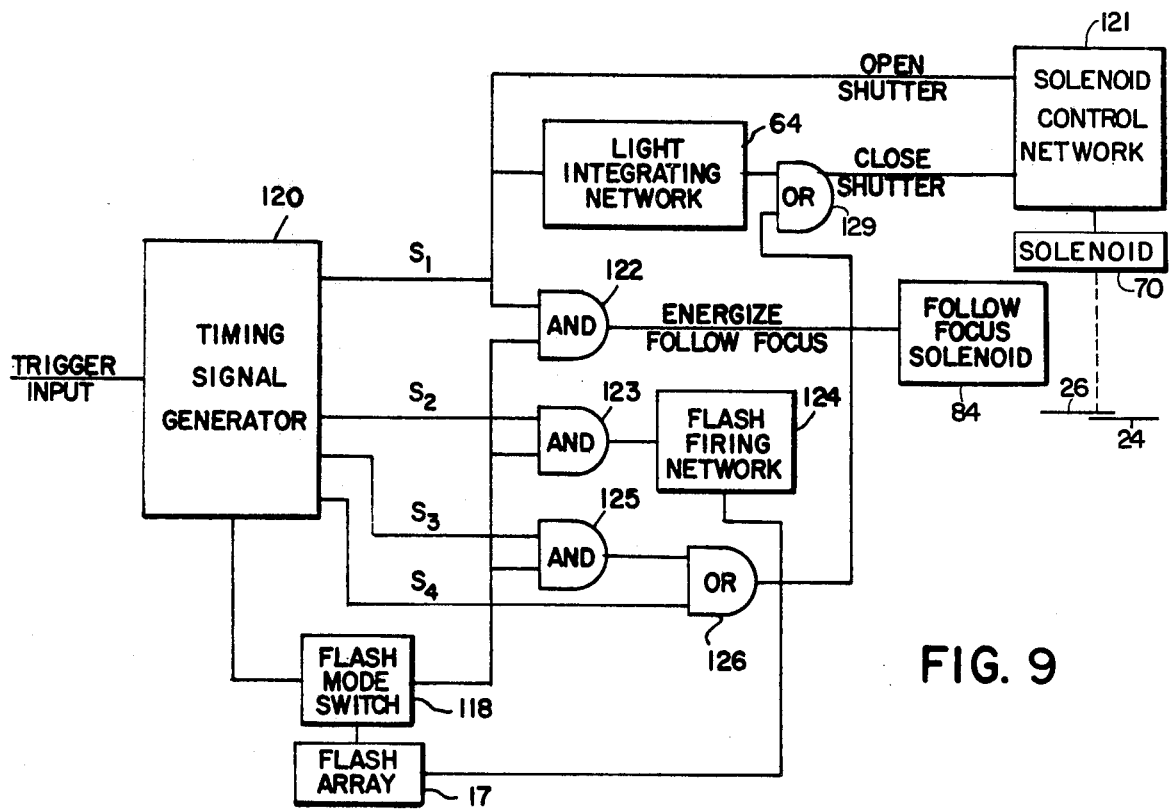
FIG. 9 is a block diagram showing the functional components and circuit interrelationships of a control system utilized in the mechanism shown in FIG. 1.

Referring now to FIG. 9 wherein a typical exposure control system is shown in block diagram form, it should be noted that the system employs a timing signal generator designated at 120. Following the preparation of the exposure chamber (not shown), a trigger signal is delivered to the timing signal generator 120 which may, for example, take the form of a clock and decoder network, to provide appropriately timed pulses for controlling the element of the exposure control system. This signal generator 120 emits a first signal designated S1 which by means of a solenoid control network 121 (for example, a flip-flop network) de-energizes the solenoid 70 to open the blades 24 and 26 and also energizes light-integrating network 62 to begin evaluating scene lighting. This signal S1 is also delivered to a first AND gate designated at 122 which will only energize the follow-focus solenoid 84 when the flash array 17 has been plugged into the flash mode switch 118. Where the latter is not the case, ambient operation ensues in which the blades open until the integrating network 64 emits a "close" signal through an OR gate designated at 129 to again energize the solenoid 70 and return the blades to their closed position. During this ambient operation, if the light level is low, the walking beam 28 displaces the blades until the former engages the fixed stop 78 at which point the blades 24 and 26 are held in their full open position (shown in FIG. 7) with the taking aperture at its maximum and the photocell aperture at a value reduced slightly from its maximum.

On the other hand, where a flash array 17 has been coupled to the system such that the flash mode switch 118 is energized, the follow-focus solenoid will be energized through the AND gate 122. This energization of the follow-focus solenoid 84 takes place just prior to or simultaneously with the initial start of opening of the blades 26 and 28. Once the follow-focus solenoid 84 has been energized and the blades driven open, the selected aperture will be defined by engagement of the walking beam 28 with the interceptor element 90. After an appropriate time to allow the blades to reach the selected aperture, the signal generator 120 then provides a second signal designated S2 which, through an AND gate 123, triggers the flash array 17 by means of a flash firing network 124.

As the flash fires, the light-integrating network 62 receives increased light energy which under normal flash conditions is sufficient to trigger the light-integrating network 64 to close the blades. This terminating of the exposure cycle by means of the light-integrating network 64 should normally occur prior to any further signals being emitted by the timing signal generator. However, assuming the light energy of a given flash is unusually low or fails to fire such that the light-integrating network 64 does not receive sufficient scene light to produce a closing signal, within an appropriate period of time, the timing signal generator 120 produces a third signal designated at S3 which is timed to occur at the completion of the flashing. This signal S3 is fed to a third AND gate 125, then to an OR gate 126 and from the latter to the gate 129 to close the blades. Additionally, the timing signal generator 120 produces a final signal designated at S4, approximately 25 milliseconds after the origins of signal S1, which also is configured to close the shutter through OR gate 126 and 129 so as to provide a safety factor assuming the blade mechanism has failed to receive either the signal from the light-integrating network 64 or the S3 signal. Of course, any of the signals which energize the solenoid 70 to close the shutter can also be employed to subsequently reset the camera to a viewing mode.

It should be noted that while the timing signal generator 120 is configured to provide the signals S1–S4 automatically in either mode of operation, in the ambient mode of operation, however, since the flash mode switch 118 is not rendered on by plugging in the flash array 17, the S2 and S3 signals have no effect since their appropriate AND gates 123 and 125 do not receive a signal from the flash mode switch 118. Further, the follow-focus solenoid 84 would also not be energized by the S1 signal since its AND gate 122 also fails to receive a signal from the flash mode switch 118.

It should be understood that this invention may be practiced or embodied in still other ways without departing from the spirit or essential character thereof. Hence, the illustrated embodiment herein is illustrated and not restrictive, the scope of the invention being indicated by the appended claims and all variations which come within the meaning of the claims are intended to be embraced therein.

What is claimed is:

1. A photographic camera comprising:
    means for mounting photographic film material at a given film plane and for defining a given optical path along which image-carrying light rays may be transmitted to said film plane from the scene to be photographed;
    means for defining a time interval responsive to the brightness of the scene;
    means for unblocking and blocking said given optical path and for controlling said interval defining means, said unblocking and blocking means including means operative in a first range during unblocking of said given optical path for defining an aperture value progressively varying between a minimum and a maximum in operative relation to said given optical path and for controlling said interval defining means to vary the response thereof between minimum and maximum values and operative in a second range during unblocking of said given path for maintaining said aperture value at substantially said maximum value while reducing from its maximum value the response of said interval defining means to the scene brightness so as to accommodate low level scene brightness;
    actuatable means for operating said unblocking and blocking means to unblock the given optical path and thereby initiate an exposure interval and, in response to said interval defining means, for subsequently operating said unblocking and blocking means to terminate said exposure interval;
    means for selecting either ambient or artificial illumination operation of said camera; and
    means responsive to selection of said artificial illumination operation for precluding operation of said unblocking and blocking means in said second range and thereby preclude said reduction of response of said interval defining means during said artificial illumination operation.

2. The camera of claim 1 wherein said precluding means includes means responsive to selection of said artificial illumination operation for controlling said unblocking and blocking means to select a predetermined aperture value as a function of subject distance.

3. The camera of claim 1 additionally including a variable lens assembly for focusing scene light rays on said film plane, and wherein said precluding means includes means responsive to varying of said lens assembly for controlling said unblocking and blocking means to select a predetermined aperture value in accordance with operation of said lens assembly.

4. A photographic exposure control system for a camera, said camera having means for mounting photographic film material at a given focal plane so as to receive image-carrying rays transmitted from the photographic scene along a given optical path, and means for selecting either ambient or artificial illumination operation, said system comprising:
    means for sensing the brightness of the scene to be photographed;
    a blade mechanism operative for unblocking and blocking at least said given optical path and for defining a primary aperture value in operative relation to said given optical path and a secondary aperture value in operative relation to said brightness sensing means, means for mounting said blade mechanism for displacement in a given direction between a first terminal arrangement wherein said blade mechanism is in blocking relation to at least said given optical path and a second terminal arrangement wherein said blade mechanism is in unblocking relation to both said given optical path and said sensing means, said blade mechanism defining primary and secondary aperture values progressively enlarging from a minimum to a maximum as said blade mechanism is displaced from said first terminal arrangement to a given blade arrangement just short of said second terminal arrangement and a reduced secondary aperture value as said blade mechanism is displaced from said given arrangement to said second terminal arrangement, said reduced secondary aperture value providing a reduction in brightness sensed by said sensing means so as to accommodate low light level brightness conditions of the photographic scene;
    actuatable means operative in both ambient or artificial illumination operation for displacing said blade mechanism from its said first terminal arrangement toward its said second terminal arrangement to unblock said given optical path and initiate an exposure interval during which scene light is directed to the focal plane and, responsive to said scene brightness sensing means, for subsequently displacing said blade mechanism into a blocking arrangement to terminate the exposure interval; and
    means responsive to selection of said artificial illumination operation for precluding displacement of said blade member beyond said given blade arrangement.

5. The system of claim 4 wherein said blade mechanism includes a pair of blade members mounted for displacement with respect to each other, each of said blade members having a primary and a secondary opening which when displaced into at least partial coincidence with the corresponding opening of the other blade member respectively define a primary aperture in operative relation to said given optical path and a secondary aperture in operative relation to said sensing means, said primary and secondary openings being configured for providing enlarging aperture values reaching a substantial maximum as said blade members are displaced from said first terminal arrangement to said given blade arrangement, and at least said secondary openings being configured for providing an aperture value less than is said maximum value as said blade members are displaced from said given blade arrangement to said second terminal arrangement.

6. The system of claim 4 additionally including means for determining the distance between said system and a subject to be photographed and wherein said precluding means comprises means responsive to said determining means for halting displacement of said blade member at a position selected in accordance with said determing means so as to provide a primary and secondary aperture value in accordance with subject distance, the range of operation of said halting means limiting the maximum displacement of said blade mechanism to said given arrangement.

7. The system of claim 4 including a variable lens for focusing scene light rays on the focal plane, said precluding means comprises follow-focus means coupled to said lens for halting displacement of said blade mechanism at an arrangement selected in accordance with focusing of said lens so as to provide primary and secondary aperture values in accordance therewith, the range of operation of said follow-focus means limiting the maximum displacement of said blade mechanism to said given arrangement.

* * * * *